US008893183B2

(12) United States Patent
Terakado et al.

(10) Patent No.: US 8,893,183 B2
(45) Date of Patent: *Nov. 18, 2014

(54) INFORMATION PROVIDING APPARATUS AND METHOD, DISPLAY CONTROLLING APPARATUS AND METHOD, INFORMATION PROVIDING SYSTEM, AS WELL AS TRANSMISSION MEDIUM

(75) Inventors: Tomoko Terakado, Kanagawa (JP); Tomoyuki Hanai, Kanagawa (JP); Yasutomo Nishina, Chiba (JP); Toshiya Kaihoko, Tokyo (JP)

(73) Assignee: Sony Corporation, Tokyo (JP)

( * ) Notice: Subject to any disclaimer, the term of this patent is extended or adjusted under 35 U.S.C. 154(b) by 266 days.

This patent is subject to a terminal disclaimer.

(21) Appl. No.: 13/349,965

(22) Filed: Jan. 13, 2012

(65) Prior Publication Data

US 2012/0137327 A1    May 31, 2012

Related U.S. Application Data

(63) Continuation of application No. 09/844,354, filed on Apr. 27, 2001, now Pat. No. 8,104,062, which is a continuation of application No. 08/946,524, filed on Oct. 7, 1997, now Pat. No. 6,311,329.

(30) Foreign Application Priority Data

Oct. 14, 1996 (JP) .................................. 8-270916
Aug. 29, 1997 (JP) .................................. 9-233647

(51) Int. Cl.
*H04N 5/50* (2006.01)
*G06F 13/00* (2006.01)
(Continued)

(52) U.S. Cl.
CPC ......... *H04N 21/2625* (2013.01); *H04N 21/262* (2013.01); *H04N 21/6547* (2013.01); *H04N 21/4345* (2013.01); *H04N 5/44543* (2013.01); *H04N 21/84* (2013.01); *H04N 21/6187* (2013.01); *H04N 21/8543* (2013.01); *H04N 5/44* (2013.01); *H04N 7/165* (2013.01); *H04N 7/0887* (2013.01); *H04N 21/26283* (2013.01)
USPC ................................. 725/44; 725/43; 725/47

(58) Field of Classification Search
USPC .............................. 725/39, 44, 43, 42, 47, 52
See application file for complete search history.

(56) References Cited

U.S. PATENT DOCUMENTS 5,038,211 A   8/1991  Hallenbeck
5,355,480 A   10/1994 Smith et al.
(Continued)

FOREIGN PATENT DOCUMENTS

EP   0 669 761   8/1995
JP   7 7684      1/1995
(Continued)

OTHER PUBLICATIONS

Hiroshi Seno et al., "A Consideration of Data Transmission Method for Enhanced Teletext", vol. 16, No. 71, pp. 1-6, Oct. 1992.

(Continued)

*Primary Examiner* — Pankaj Kumar
*Assistant Examiner* — Reuben M Brown
(74) *Attorney, Agent, or Firm* — Frommer Lawrence & Haug LLP; William S. Frommer

(57) ABSTRACT

An information providing apparatus, in which program guide information is provided as first information which designates predetermined information and second information to be referred to by the first information. Layout information is provided from within the electronic program guide information, relating to the layout when the electronic program guide information is displayed on a screen.

19 Claims, 12 Drawing Sheets

EXAMPLE OF DATA (B DATA) OF ELECTRONIC PROGRAM

(51) Int. Cl.
*H04N 21/262* (2011.01)
*H04N 21/6547* (2011.01)
*H04N 21/434* (2011.01)
*H04N 5/445* (2011.01)
*H04N 21/84* (2011.01)
*H04N 21/61* (2011.01)
*H04N 21/8543* (2011.01)
*H04N 5/44* (2011.01)
*H04N 7/16* (2011.01)
*H04N 7/088* (2006.01)
*H04N 7/173* (2011.01)
*H04N 7/08* (2006.01)

(56) References Cited

U.S. PATENT DOCUMENTS

| | | | |
|---|---|---|---|
| 5,404,505 A | 4/1995 | Levinson | |
| 5,465,385 A * | 11/1995 | Ohga et al. | 725/58 |
| 5,579,055 A * | 11/1996 | Hamilton et al. | 725/49 |
| 5,585,838 A | 12/1996 | Lawler et al. | |
| 5,585,865 A | 12/1996 | Amano et al. | |
| 5,596,373 A * | 1/1997 | White et al. | 348/569 |
| 5,635,978 A | 6/1997 | Alten et al. | |
| 5,686,954 A | 11/1997 | Yoshinobu et al. | |
| 5,726,702 A | 3/1998 | Hamaguchi et al. | |
| 5,727,159 A | 3/1998 | Kikinis | |
| 5,731,844 A | 3/1998 | Rauch et al. | |
| 5,790,198 A | 8/1998 | Roop et al. | |
| 5,798,785 A | 8/1998 | Hendricks et al. | |
| 5,822,123 A * | 10/1998 | Davis et al. | 725/43 |
| 5,844,620 A * | 12/1998 | Coleman et al. | 725/54 |
| 5,880,768 A | 3/1999 | Lemmons et al. | |
| 5,935,004 A | 8/1999 | Tarr et al. | |
| 6,005,561 A * | 12/1999 | Hawkins et al. | 715/234 |
| 6,008,803 A * | 12/1999 | Rowe et al. | 348/E5.105 |
| 6,028,599 A | 2/2000 | Yuen et al. | |
| 6,029,123 A | 2/2000 | Suda et al. | |
| 6,029,193 A | 2/2000 | Yamamoto et al. | |
| 6,247,176 B1 | 6/2001 | Schein et al. | |
| 6,311,329 B1 * | 10/2001 | Terakado et al. | 725/44 |
| 6,460,179 B1 * | 10/2002 | Kretz et al. | 725/37 |
| 6,598,075 B1 | 7/2003 | Ogdon et al. | |
| 7,095,871 B2 | 8/2006 | Jones et al. | |
| 8,104,062 B2 * | 1/2012 | Terakado et al. | 725/50 |
| 2003/0196201 A1 | 10/2003 | Schein et al. | |
| 2005/0160452 A1 * | 7/2005 | Lawler et al. | 725/38 |
| 2006/0195868 A1 | 8/2006 | Townsend et al. | |
| 2012/0137327 A1 * | 5/2012 | Terakado et al. | 725/44 |

FOREIGN PATENT DOCUMENTS

| | | |
|---|---|---|
| JP | 7 284035 | 10/1995 |
| JP | 7 288784 | 10/1995 |
| JP | 8 102922 | 4/1996 |
| JP | 8 115333 | 5/1996 |
| JP | 10-13798 | 1/1998 |
| JP | 4032402 | 1/2008 |
| WO | WO 91 00670 | 1/1991 |
| WO | WO 94 14283 | 6/1994 |
| WO | WO 95 15657 | 6/1995 |
| WO | WO 95 28799 | 10/1995 |
| WO | WO 95 31069 | 11/1995 |
| WO | WO 97 02701 | 1/1997 |

OTHER PUBLICATIONS

Kenjiro Kai et al., "Development of a Simulation System for Integrated Services Television", 1996. 9, 13.

* cited by examiner

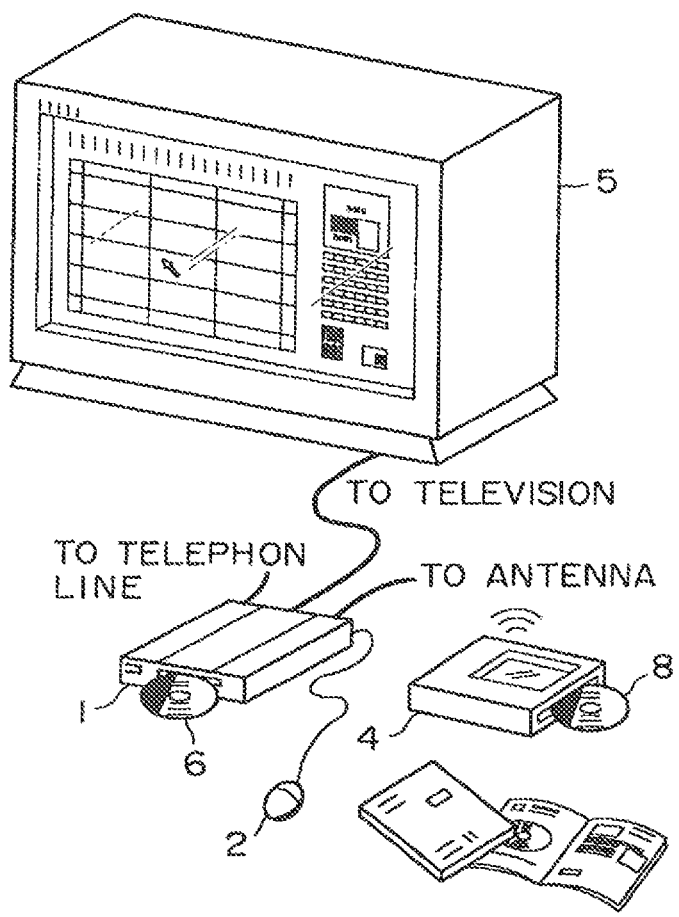

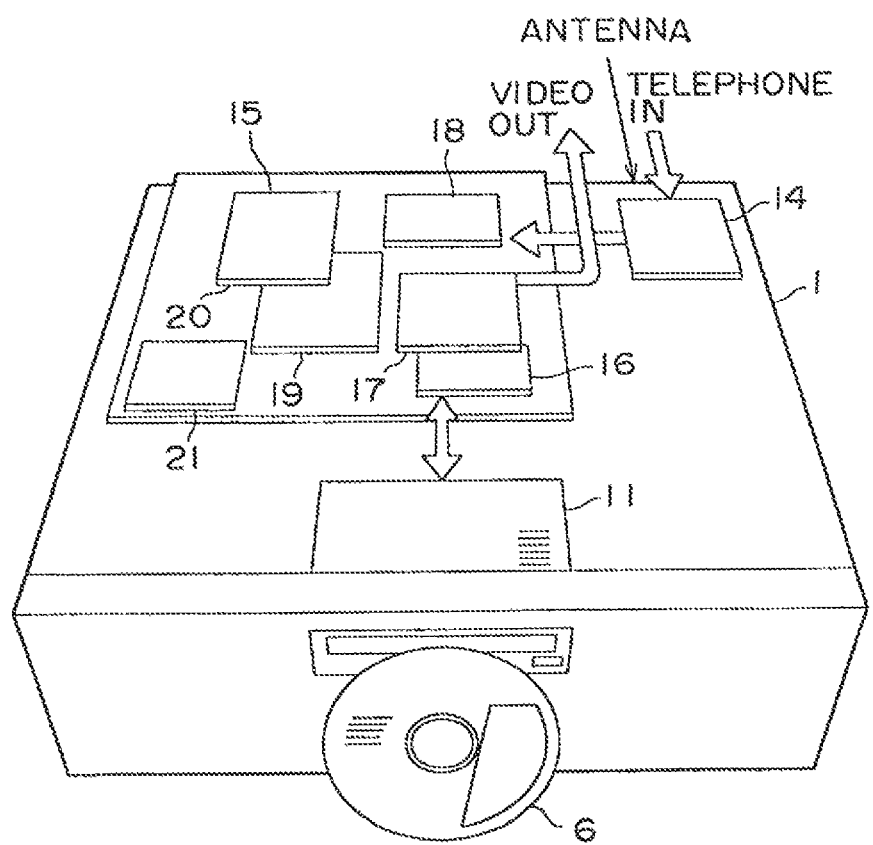

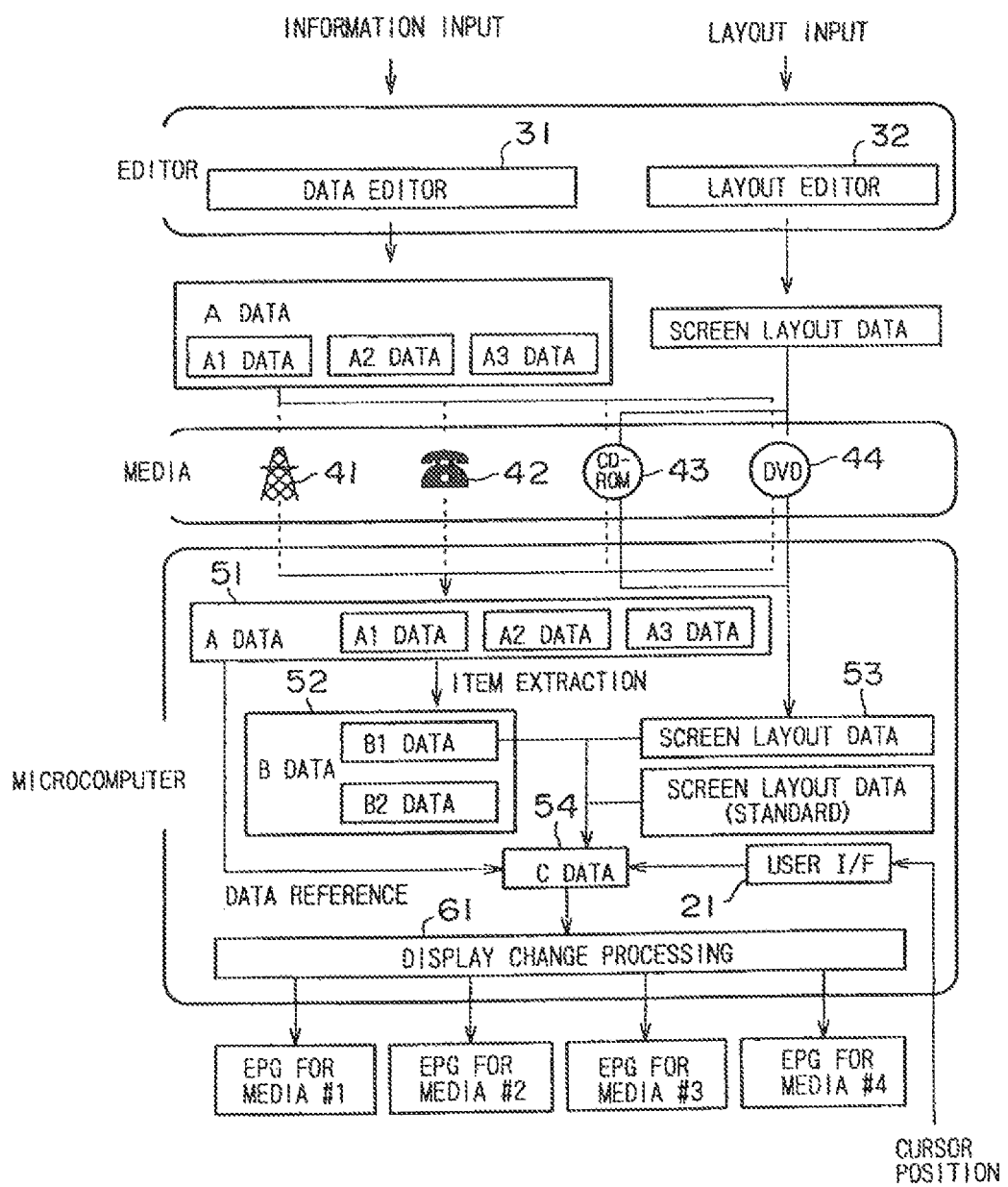

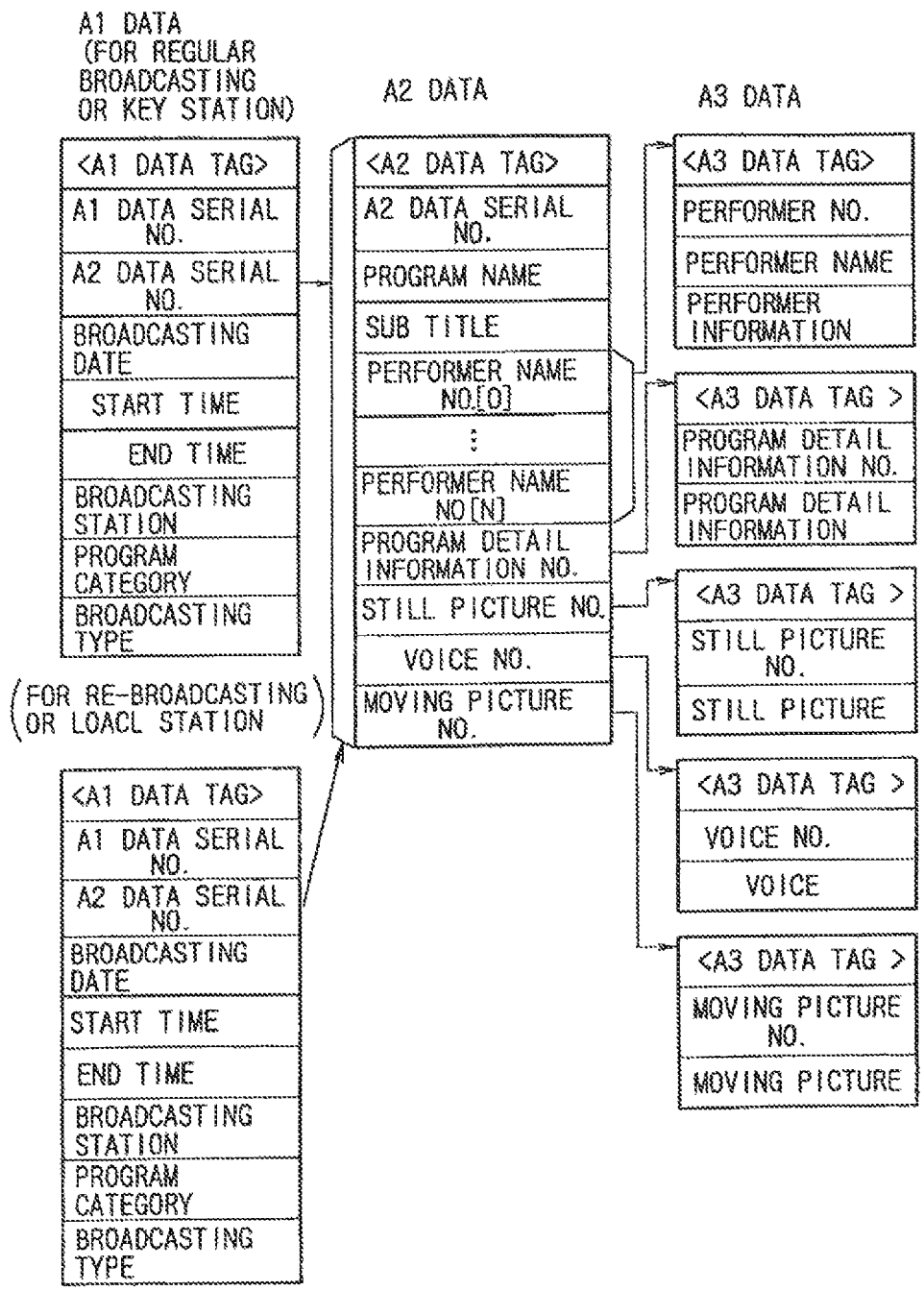
EXAMPLE OF DATA (A DATA) OF ELECTRONIC PROGRAM TABLE

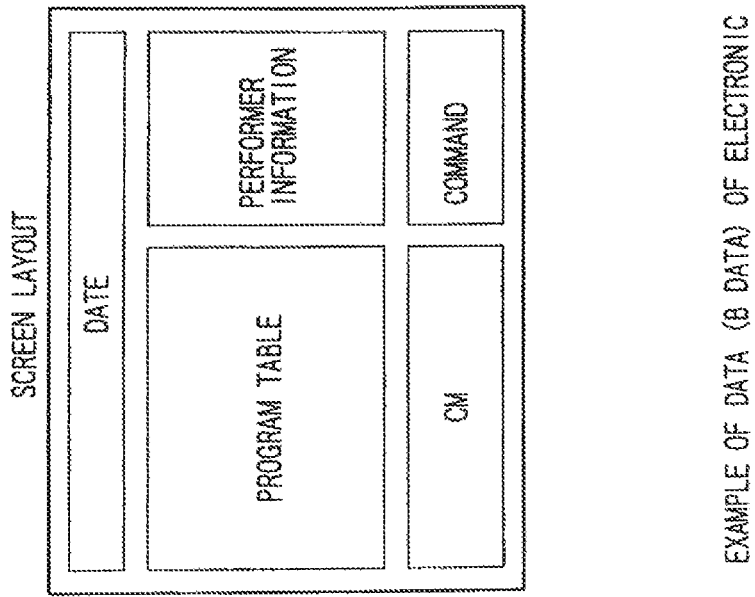

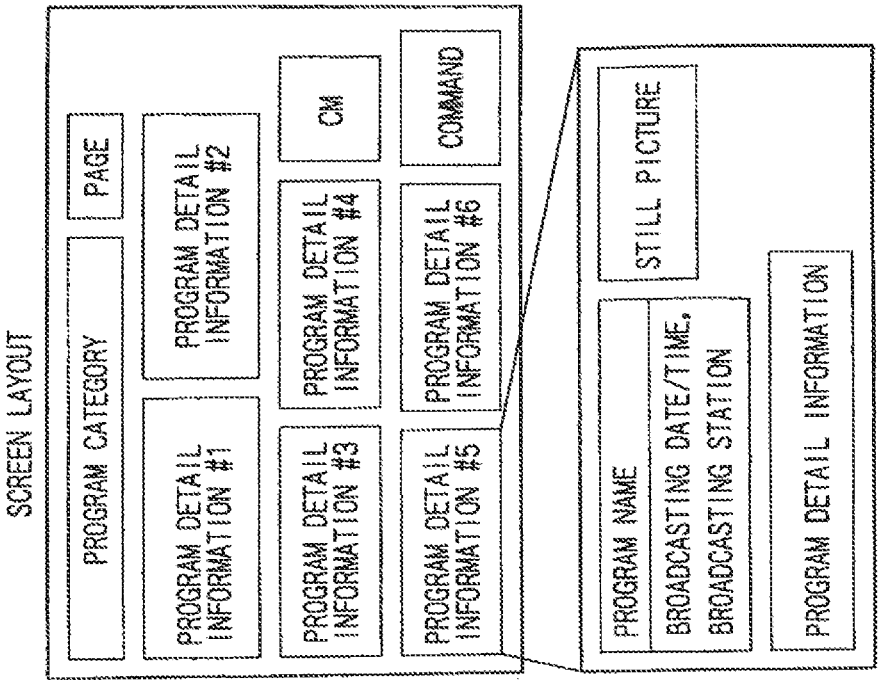

F I G. 7

EXAMPLE OF PROGRAM DETAIL INFORMATION

| PROGRAM CATEGORY | PROGRAM DETAIL INFORMATION EXAMPLE |
|---|---|
| MOVIE | COMMENTARY, OUTLINE, SHOOTING LOCATION INFORMATION, RELATING INFORMATION (VIDEO), PREVIEW |
| SPORTS | COMMENTARY, RESULTS IN THE PAST, CURRENT SITUATION, PLAYER INFORMATION, SPORTS COMMENTARY |
| MUSIC | COMMENTARY, MUSIC NAME/TEXT, PREVIEW RELATING INFORMATION (CONCERT/ALBUM) |
| CULTURE | COMMENTARY, MATERIAL/HOW TO MAKE, PREVIEW RELATING INFORMATION (BOOK) |
| SHOPPING | COMMODITY EXPLANATION/LIST, APPLICATION DESTINATION |
| DRAMA (SERIAL) | COMMENTARY, OUTLINE, SHOOTING LOCATION INFORMATION, RELATING INFORMATION (VIDEO), INSERTED MUSIC INFORMATION, LAST INSTALLMENT OUTLINE, PREVIEW |
| DRAMA (SINGLE) | COMMENTARY, OUTLINE, SHOOTING LOCATION INFORMATION, RELATING INFORMATION (VIDEO), RELATING INFORMATION (INSERTED MUSIC) |
| NEWS | COMMENTARY, RELATING INFORMATION (KNOWLEDGE/LOCATION), WEATHER FORECAST, STOCK PRICE |
| CHILDREN'S PROGRAM | COMMENTARY, OUTLINE, RELATING INFORMATION (COMMODITY) |
| POLITICS · ECONOMICS | COMMENTARY, RELATING INFORMATION (KNOWLEDGE/LOCATION) |
| SCIENCE · EDUCATION | COMMENTARY, RELATING INFORMATION (KNOWLEDGE/LOCATION) |
| SPECIAL | COMMENTARY, RELATING INFORMATION |
| SHOW | COMMENTARY, RELATING INFORMATION (NEXT SHOW) |

F I G. 12

| A | B | C | D |
|---|---|---|---|
| SDTV | DATA | DATA | DATA |
| SDTV | | SDTV | EDTV |
| SDTV | HDTV | SDTV | |
| SDTV | | SDTV | EDTV |

US 8,893,183 B2

INFORMATION PROVIDING APPARATUS AND METHOD, DISPLAY CONTROLLING APPARATUS AND METHOD, INFORMATION PROVIDING SYSTEM, AS WELL AS TRANSMISSION MEDIUM

This is a continuation of U.S. application Ser. No. 09/844,354, filed Apr. 27, 2001 now U.S. Pat. No. 8,104,062, which is a continuation of U.S. application Ser. No. 08/946,524, filed Oct. 7, 1997 now U.S. Pat. No. 6,311,329, which claims priority under 35 USC 119 to Japanese Application 8-270916, filed in Japan on Oct. 14, 1996, and to Japanese Application 9-233,647, filed in Japan on Aug. 29, 1997, the entirety thereof being incorporated herein by reference.

BACKGROUND OF THE INVENTION

This invention relates to an information providing apparatus and method, a display controlling apparatus and method, an information providing system and a transmission medium, and more particularly to an information providing apparatus and method, a display controlling apparatus and method, an information providing system and a transmission medium by which, when, for example, data of a program table including characters and images are to be transmitted, the amount of data to be transmitted is reduced and a change of the program table can be performed rapidly.

Ordinarily, in order to get a program table of a television, a television program column of a newspaper or a magazine is referred to. Meanwhile, in recent years, it has been increased to practice to provide a program table through the Internet. In this instance, a program table is described in a describing language such as the HTML (Hyper Text Markup Language). A user can observer the program table using a predetermined browser. Further, it is also possible to provide data of the program table by media such as broadcasting radio waves or the like.

However, a program table provided through the Internet is described in a describing language such as the HTML, and image data or the like are sometimes included in the program table. Further, in such a case that a program table includes, for example, a re-forecast program, since data overlap, there is a problem in that a large amount of data is involved and a considerable time is required for transmission or reading in of the data.

It is another problem that, if the broadcasting date or the broadcasting time of a predetermined program in a program table or contents of a program are changed, much time is required since it is required to change all portions relating to the program and re-send data of the changed portions.

SUMMARY OF THE INVENTION

It is an object of the present invention to provide an information providing apparatus and method, a display controlling apparatus and method, an information providing system and a transmission medium by which the amount of data to be transmitted when data of a program table composed of characters and images or the like are to be transmitted is reduced and it is made possible to cope with a change in contents of data rapidly.

In order to attain the object described above, according to an aspect of the present invention, there is provided an information providing apparatus, comprising hierarchizing means for hierarchizing electronic program guide information to be provided into first information which designates predetermined information and second information to be referred to by the first information, first providing means for providing at least one of the hierarchized first information and second information, and second providing means for providing layout information from within the electronic program guide information which relates to a layout when the electronic program guide information is to be displayed on a screen.

According to another aspect of the present invention, there is provided an information providing method, comprising the steps of hierarchizing electronic program guide information to be provided into first information which designates predetermined information and second information to be referred to by the first information, providing the hierarchized first information or second information, and providing layout information from within the electronic program guide information which relates to a layout when the electronic program guide information is to be displayed on a screen.

According to a further aspect of the present invention, there is provided a transmission medium which transmits a program, the program including the steps of hierarchizing electronic program guide information to be provided into first information which designates predetermined information and second information to be referred to by the first information, providing at least one of the hierarchized first information or second information, and providing layout information which relates to a layout when the electronic program guide information is to be displayed on a screen.

In the information providing apparatus, the information providing apparatus and the transmission medium, electronic program guide information to be provided is hierarchized into first information which designates predetermined information and second information to be referred to by the first information. Then, at least one of the first information and the second information, and layout information from within the electronic program guide information which relates to a layout when the electronic program guide information is to be displayed on a screen, are provided.

Thus, with the information providing apparatus, the information providing apparatus and the transmission medium, since electronic program guide information is hierarchized into first information and second information so that they may be provided together with layout information, in such a case that re-forecasting is performed or a program is changed, the amount of data to be provided can be reduced.

According to a still further aspect of the present invention, there is provided a display controlling apparatus, comprising first acquiring means for acquiring, from within electronic program guide information hierarchized into first information which designates predetermined information and second information to be referred to by the first information, at least one of the first information and the second information, second acquiring means for acquiring layout information of the electronic program guide information regarding a layout when the electronic program guide information is to be displayed on a screen, and producing means for producing display information to be used to display the electronic program guide information from at least one of the first information and the second information, and the layout information.

According to a yet further aspect of the present invention, there is provided a display controlling method, comprising the steps of acquiring, from within electronic program guide information hierarchized into first information which designates predetermined information and second information to be referred to by the first information, at least one of the first information and the second information, acquiring layout information regarding a layout of the electronic program guide information when the EPG information is to be displayed on a screen, and producing display information to be used to display the electronic program guide information from at least one of the first information and the second information, and the layout information.

According to a yet further aspect of the present invention, there is provided a transmission medium which transmits a program, the program including the steps of acquiring, from within electronic program guide information hierarchized into first information which designates predetermined information and second information to be referred to by the first information, at least one of the first information and the second information, acquiring layout information regarding a layout of the electronic program guide information when the electronic program guide information is to be displayed on a screen, and producing display information to be used to display the electronic program guide information from at least one of the first information and the second information, and the layout information.

In the display controlling apparatus, the display controlling method and the transmission medium, at least one of the first information and the second information, and the layout information are fetched. Then, display information to be used to display the electronic program guide information is produced from at least one of the first information and the second information, and the layout information.

With the display controlling apparatus, the display controlling method and the transmission medium, since display information to be used to display the electronic program guide information is produced based on at least one of first information and second information of hierarchized electronic program guide information and layout information, data can be acquired efficiently and displayed rapidly. Accordingly, it is possible to rapidly cope with a case wherein a change in broadcasting time or the like occurs.

According to a yet further aspect of the present invention, there is provided an information providing apparatus, comprising hierarchizing means for hierarchizing electronic program guide information to be provided into first information which designates predetermined information and second information to be referred to by the first information, first providing means for providing at least one of the hierarchized first information or second information, second providing means for providing layout information from within the electronic program guide information which relates to a layout when the electronic program guide information is to be displayed on a screen, first acquiring means for acquiring at least one of the first information and the second information, second acquiring means for acquiring layout information of the electronic program guide information regarding a layout when the electronic program guide information is to be displayed on a screen, and producing means for producing display information to be used to display the electronic program guide information from at least one of the first information and the second information, and the layout information.

According to a yet further aspect of the present invention, there is provided an information providing method, comprising the steps of hierarchizing electronic program guide information to be provided into first information which designates predetermined information and second information to be referred to by the first information, providing at least one of the hierarchized first information and second information, providing layout information from within the electronic program guide information which relates to a layout when the electronic program guide information is to be displayed on a screen, acquiring at least one of the first information and the second information, acquiring layout information of the electronic program guide information regarding a layout when the electronic program guide information is to be displayed on a screen, and producing display information to be used to display the electronic program guide information from at least one of the first information and the second information, and the layout information.

According to a yet further aspect of the present invention, there is provided a transmission medium which transmits a program, the program including the steps of hierarchizing electronic program guide information to be provided into first information which designates predetermined information and second information to be referred to by the first information, providing at least one of the hierarchized first information and second information, providing layout information from within the electronic program guide information which relates to a layout when the electronic program guide information is to be displayed on a screen, acquiring at least one of the first information and the second information, acquiring layout information of the electronic program guide information regarding a layout when the electronic program guide information is to be displayed on a screen, and producing display information to be used to display the electronic program guide information from at least one of the first information and the second information, and the layout information.

In the information providing system, the information providing method and the transmission medium, electronic program guide information is hierarchized into first information and second information. At least one of the first information and the second information, and layout information from within the electronic program guide information which is used when the electronic program guide information is to be displayed on a screen, are provided. Display information to be used to display the electronic program guide information is produced from at least one of the first information and the second information, and the layout information.

With the information providing system, the information providing method and the transmission medium, since electronic program guide information is hierarchized into first information and second information and provided together with layout information and display information to be used to display the electronic program guide information is produced based on at least one of the first information and the second information, and the layout information, the amount of data to be provided can be reduced in such a case wherein a change in broadcasting time or the like occurs. Accordingly, it is possible to rapidly cope with a case wherein a change in broadcasting time or the like occurs.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 1 is a view showing an AV system to which the present invention is applied;

FIG. 2 is a block diagram showing an exemplary detailed construction of a CD-ROM drive shown in FIG. 1;

FIG. 3 is a diagrammatic view illustrating a procedure of converting data of a program table and data of a screen layout into statements of an EPG (electronic program guide) processing language and displaying an EPG;

FIGS. 4A to 4C are diagrammatic views illustrating an exemplary detailed construction of A data for an electronic program table which is used in the AV system of FIG. 1;

FIGS. 5A to 5C are diagrammatic views illustrating an exemplary construction of B data for displaying an electronic program table which is used in the AV system of FIG. 1;

FIGS. 6A to 6C are diagrammatic views illustrating an exemplary construction of B data for displaying a program detail information screen which is used in the AV system of FIG. 1;

FIG. 7 is a diagrammatic view illustrating an example of program detail information used in the AV system of FIG. 1;

FIG. 12 is a diagrammatic view illustrating bands of digital television signals.

DESCRIPTION OF THE PREFERRED EMBODIMENT

Figure 8:
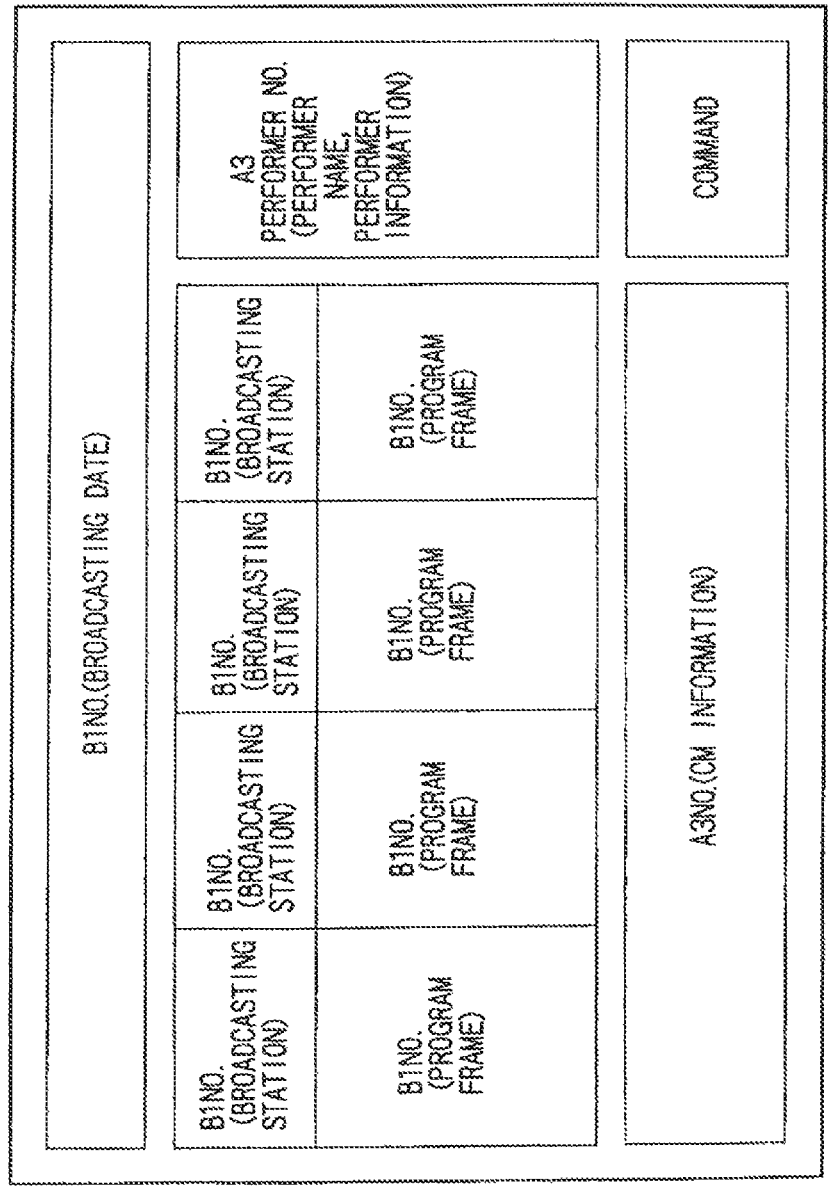
FIG. 8 is a diagrammatic view illustrating an exemplary construction of C data corresponding to a screen layout shown in FIG. 5C.

Referring first to FIG. 1, there is shown an exemplary construction of an AV (audio visual) system to which an information providing system to which the present invention is applied is incorporated. It is to be noted that, in the present specification, the term "system" represents an entire apparatus formed from a plurality of function elements.

The AV system shown includes a CD-ROM (compact disc read only memory) drive 1 constructed so as to read, for example, program information and data regarding a layout of a program table recorded on an electronic program guide CD-ROM 6 on which an electronic program guide which is published every week is recorded.

The CD-ROM drive 1 supplies data read out from a CD-ROM 6 or data to be used to display a program table superposed on a television signal of a predetermined channel supplied from an antenna not shown on a screen to a television receiver 5. A mouse 2 is manually operated when a user tries to select a channel or effect program reservation while observing a program table displayed on the television receiver 5.

Data regarding a program table is composed of, as hereinafter described, original data (hereinafter referred to as A data), intermediate data (hereinafter referred to as B data), display data (hereinafter referred to as C data) and screen layout data corresponding to each display screen.

A PDA (personal digital assistants) unit 4 is constructed so as to read out program table data from an electronic program guide CD-ROM 6, display the program table on a screen of the PDA and select a channel while the program table is observed. The PDA unit 4 is constructed so as to transmit contents of an operation when program reservation is to be performed to the television receiver 5 by infrared rays or the like. The television receiver 5 is constructed so as to display an ordinary broadcasting program or display a screen of a program table based on data supplied from the CD-ROM drive 1 or the PDA unit 4.

FIG. 2 shows an exemplary internal construction of the CD-ROM drive 1 shown in FIG. 1. The CD-ROM drive 1 includes a CD-ROM driving section 11 constructed so as to reproduce a CD-ROM 6 and output data regarding program information or screen layout data.

A microcomputer 15 includes a memory 18, a browser control section 19, a data converting section 20, a graphic engine 17, a user interface control section 21, a VRAM (video RAM) 16 and so forth. The microcomputer 15 receives data outputted from the CD-ROM driving section 11, produces data for displaying a screen of a program table or the like and outputs the produced data. The memory 18 stores an application program and suitably stores other data necessary for processing.

The data converting section 20 converts, based on data regarding program information and screen layout data supplied thereto from the CD-ROM driving section 11, the data into statements of a describing language (EPG processing language) such as the HTML. The browser control section 19 produces display data of an EPG screen based on the EPG processing language such as the HTML obtained by the conversion by the data converting section 20 and writes the display data into the VRAM 16. The user interface control section 21 accepts various instructions from a user and outputs corresponding signals to pertaining components.

The graphic engine 17 reads out or writes image data or font data from or into the VRAM 16 at a high speed and performs high speed picture drawing processing of graphic data. A TEL (telephone) module 14 is formed from a modem or the like and constructed so as to convert an analog signal supplied through a telephone line into digital data and supply the digital data to the microcomputer 15 or convert digital data supplied from the microcomputer 15 into analog data and send out the analog data through the telephone line.

FIG. 3 illustrates a procedure wherein inputted information and data of a screen layout for displaying the inputted information are produced and provided to a user and an EPG (Electronic Program Guide) corresponding to the provided data is produced finally. First, program information is inputted and A data (original data) composed of A1 data, A2 data and A3 data are produced by a data editor 31. Then, a layout of a screen for displaying a program table or detailed information of a program is inputted using a layout editor 32 to produce screen layout data. Here, while it is described that program information and data of a screen layout for displaying the program information are inputted, other information may naturally be inputted.

For example, in such a case that a program having a program name of "The Sunflower" is to be broadcast at 12 o'clock and re-broadcast at 17 o'clock, the data editor 31 inputs program information of "The Sunflower", produces two A1 data for regular broadcasting and for re-broadcasting, and produces A2 data to be referred to commonly by the two A1 data. Also A3 data formed from more detailed data to be referred to by the A2 data is produced.

Each of the A1 data is composed of data in units of a program whose broadcasting date, broadcasting time or the like may possibly be changed. The A2 data is composed of fixed information which may not possibly be changed such as a program name and a sub title, as well as serial numbers to be used to refer to individual data in the A3 data such as performers, program detail information, still pictures, voice, and moving pictures. Further, the A3 data is substantial data of still pictures, voice, moving pictures and so forth, and the data amount can be adjusted by changing the combination in accordance with a medium by which those data are to be provided. The A3 data is referred to by the A2 data.

In particular, for example, as seen in FIG. 4A, the A1 data has different data types for regular broadcasting (key station broadcasting), for re-broadcasting (local station broadcasting) and so forth, and is composed of "A1 DATA TAG" representing that the data is A1 data, "A1 DATA SERIAL NO." representative of a serial number of the A1 data, "A2 DATA SERIAL NO." for designating A2 data to be referred to, data representative of a "BROADCASTING DATE", a "START TIME", an "END TIME", a "BROADCASTING STATION", a "PROGRAM CATEGORY" and a "BROADCASTING TYPE" of a corresponding program. Here, the "PROGRAM CATEGORY" represents a type of a program such as, for example, a news, an entertainment or a movie, and the "BROADCASTING TYPE" represents, for example, stereo, bilingual, clear vision or the like.

Meanwhile, the A2 data is composed of, in this instance, as seen in FIG. 4B, "A2 DATA TAG" representing that the data is A2 data, "A2 DATA SERIAL NO.", "PROGRAM NAME" and "SUB TITLE", data representative of "PERFORMER NO. [0]", . . . , "PERFORMER NO. [N]" for designating A3 data to be referred to, "PROGRAM DETAIL INFORMATION NO.", "STILL PICTURE NO.", "VOICE NO." and "MOVING PICTURE NO.".

Where the A3 data is data regarding a performer, the A3 data is composed of "A3 DATA TAG" representing that the data is A3 data, "PERFORMER NO.", "PERFORMER NAME" and "PERFORMER INFORMATION". Where the A3 data is data of program detail information, the A3 data is composed of "A3 DATA TAG", "PROGRAM DETAIL INFORMATION NO." and "PROGRAM DETAIL INFORMATION". Meanwhile, where the A3 data is data of a still picture, the A3 data is composed of "A3 DATA TAG", "STILL PICTURE NO." and data of "STILL PICTURE". Where the A3 data is voice data, it is composed of "A3 DATA TAG", "VOICE NO." and "DATA OF VOICE". On the other hand, where the A3 data is data of a moving picture, it is composed of "A3 DATA TAG", "MOVING PICTURE NO." and "DATA OF A MOVING PICTURE".

It is to be noted that the A3 data includes, in addition to the data described above, the name of a director or a producing person of a play book, producer information, CM information (voice, a still picture or moving pictures), and so forth.

The A data mentioned above (at least one of the A1 to A3 data) is provided to a user via a medium such as a telephone line 42, a CD-ROM 43, a DVD 44 or the like. Meanwhile, the data of a screen layout is recorded on a recording medium such as a CD-ROM 43 or a DVD 44 on which an electronic program guide is recorded and is provided to a user. Naturally, while it can be provided by a transmission medium such as broadcasting radio waves (antenna 41) or the telephone line 42, in order to raise the speed upon displaying, the former method is preferable.

A user has such an AV system as shown in FIGS. 1 and 2, and A data and data of a screen layout provided through a medium mentioned above are inputted via the antenna 41, telephone line 42, CD-ROM driving section 11 or the like, fetched by an A data producing section 51 of the data converting section 20 of the microcomputer 15 and stored into the memory 18. A1 data, A2 data and A3 data stored in the memory 18 are read out by a B data processing section 52 of the data converting section 20, and necessary items are extracted from the data in response to the layout of the display screen to produce B data.

The B data is composed of B1 data and B2 data as seen in FIG. 5. The constructions and the data contents of the B1 data and B2 data are different depending upon the screen layout. For example, in the case of a program table screen for displaying programs of a predetermined broadcasting date, program frames for 24 hours are taken by the B1 data, as seen in FIG. 5A.

In particular, the B1 data is composed of "B1 DATA TAG" representing that the data is B1 data, "B1 DATA SERIAL NO." representing a serial number of the B1 data, "B2 DATA SERIAL NO." representing a serial number of the B2 data corresponding to (referring to) the B1 data; "BROADCASTING DATE", "BROADCASTING STATION", program frames "0:00 PROGRAM FRAME", "0:10 PROGRAM FRAME", . . . , "23:50 PROGRAM FRAME" set for individual predetermined times, and so forth.

Meanwhile, the B2 data is composed of "B2 DATA TAG" representing that the data is B2 data, "B2 DATA SERIAL NO." representing a serial number of the B2 data and "B2 DATA CAPACITY" representative of the capacity of the B2 data, as well as "STACK #1" to "STACK #N" in which serial NO. of A1 data to be referred to are described. When a program table screen of such a screen layout as shown in FIG. 5C is to be displayed, for example, in the stacks #1 to #N, the serial NO. of the A1 data corresponding to individual times of the program table are placed in a sorted state.

On the other hand, when such a program detail information screen for individual categories as shown in FIG. 6C is to be displayed, the B data processing section 52 of the data converting section 20 retrieves programs to be displayed as program detail information for the individual categories, sorts the serial NO. of the A1 data corresponding to a predetermined category and places them into the individual stacks of the B2 data. The format of the B2 data is similar, as seen in FIG. 6B, to that of the program table screen shown in FIG. 5B. Meanwhile, for the B1 data, a number of frames of program detail information equal to the number of display programs are taken, and the stack NO. of B2 data to be referred is placed in a corresponding one of the frames of program detail information.

In particular, the B1 data is composed of, as seen in FIG. 6A, "B1 DATA TAG" representing that the data is B1 data, "B1 DATA SERIAL NO." representing a serial number of the B1 data, "B2 DATA SERIAL NO." representing a serial number of the B2 data corresponding to (referring to) the B1 data, "CATEGORY", "PAGE" and "PROGRAM DETAIL INFORMATION #1", . . . "PROGRAM DETAIL INFORMATION #6". Here, while the number of frames of program detail information is 6 in conformity with the layout of the program detail information screen, it may be varied in accordance with the layout.

Even if the screen layout data is common, display contents are varied. For example, even if the screen layout shown in FIG. 6C is used, if the program category or the page changes, then the display contents change.

It is to be noted that the program detail information is different for the individual categories of programs, for example, as shown in FIG. 7. For example, if the program category is "MOVIE", the program detail information may be "COMMENTARY", "OUTLINE", "SHOOTING LOCATION INFORMATION", "RELATING INFORMATION (VIDEO)", "PREVIEW" and so forth.

For example, the program detail information for each performer can be displayed by a similar method. In this instance, for example, by the user manually operating the mouse 2 to move a cursor on a GUI displayed on the television receiver 5 to a predetermined position, sorting of program detail information for each performer is instructed. This instruction is transmitted as a signal of a cursor position from the user interface control section 21 to the data converting section 20. In response to the instruction, the data converting section 20 sorts the program detail information for each performer in a similar manner as in the case described above and places it into a stack of the B2 data.

Using the B1 data and B2 data produced in this manner and the screen layout data supplied through a CD-ROM 6 (in FIG. 3, a CD-ROM 43) or the like and acquired by the screen layout data producing section 53 of the data converting section 20, a C data processing section 54 of the data converting section 20 produces C data (display data) which is used as original data when it is to be converted into statements of an EPG processing language. Further, in order to cope with a case wherein data of a screen layout is not supplied from a CD-ROM 6 or the like, it is also possible to record data of a, standard screen layout in advance in the memory 18 of the microcomputer 15. The C data refers to the A1 data, A2 data and A3 data via the B1 data and B2 data.

Figure 9:
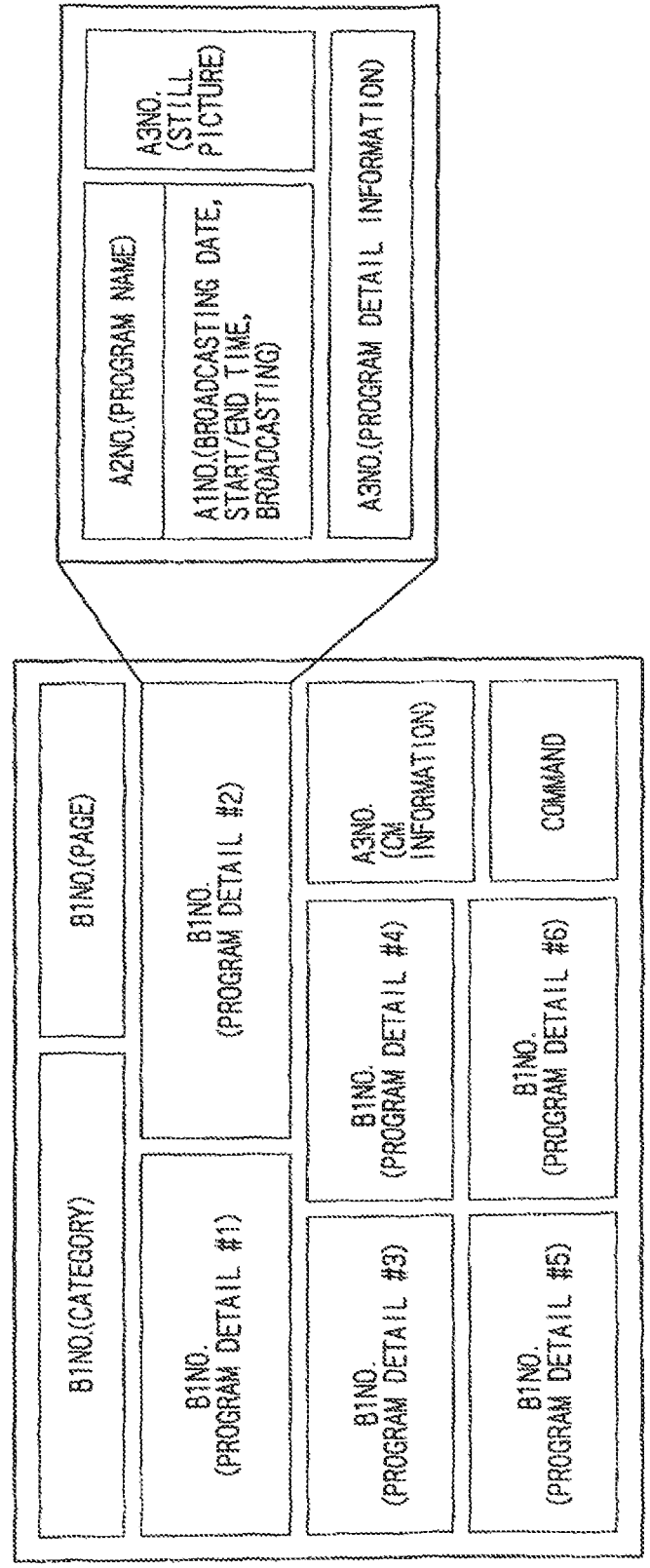
FIG. 9 is a diagrammatic view showing an exemplary construction of C data corresponding to a screen layout shown in FIG. 6C.

FIGS. 8 and 9 illustrate examples of the C data. FIG. 8 illustrates C data corresponding to the screen layout of FIG. 5C. Similarly, FIG. 9 illustrates C data corresponding to the screen layout of FIG. 6C.

The C data produced in this manner undergoes display conversion processing by a display conversion processing section 61 of the data converting, section 20, and an EPG display is provided on a screen of the television receiver 5 or the like under the control of the browser control section 19. In this instance, an EPG corresponding to a medium by which program information is to be provided to the user is produced and displayed. For example, when provision of program information is received through a CD-ROM, an EPG including a still picture in addition to characters is displayed. On the other hand, when provision of program information superposed on a television signal by broadcasting radio waves is received, an EPG composed only of simple character information is displayed.

Figure 10:
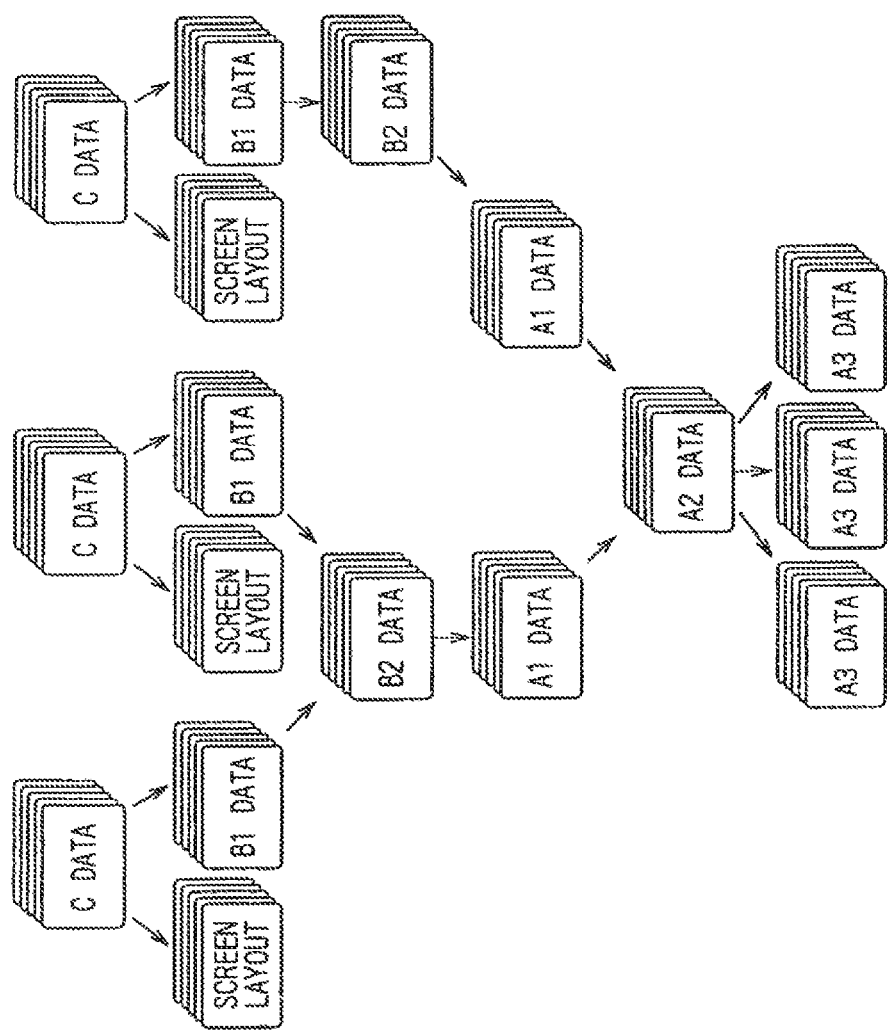
FIG. 10 is a flow diagram illustrating a reference relationship among A data, B data, C data and data of a screen layout used in the AV system of FIG. 1.

FIG. 10 illustrates a manner in which C data are produced from A data, B data and data of a screen layout in such a manner as described above. Each arrow mark indicates a direction in which data is referred to. In particular, the A3 data is referred to by the A2 data, and the A2 data is referred to by the A1 data. The A1 data is referred by the B2 data, and the B2 data is referred to by the B1 data. The B1 data and the data of a screen layout are referred to by the C data. Accordingly, the C data can refer to the A3 data via the B1 data, B2 data, A1 data and A2 data.

Figure 11:
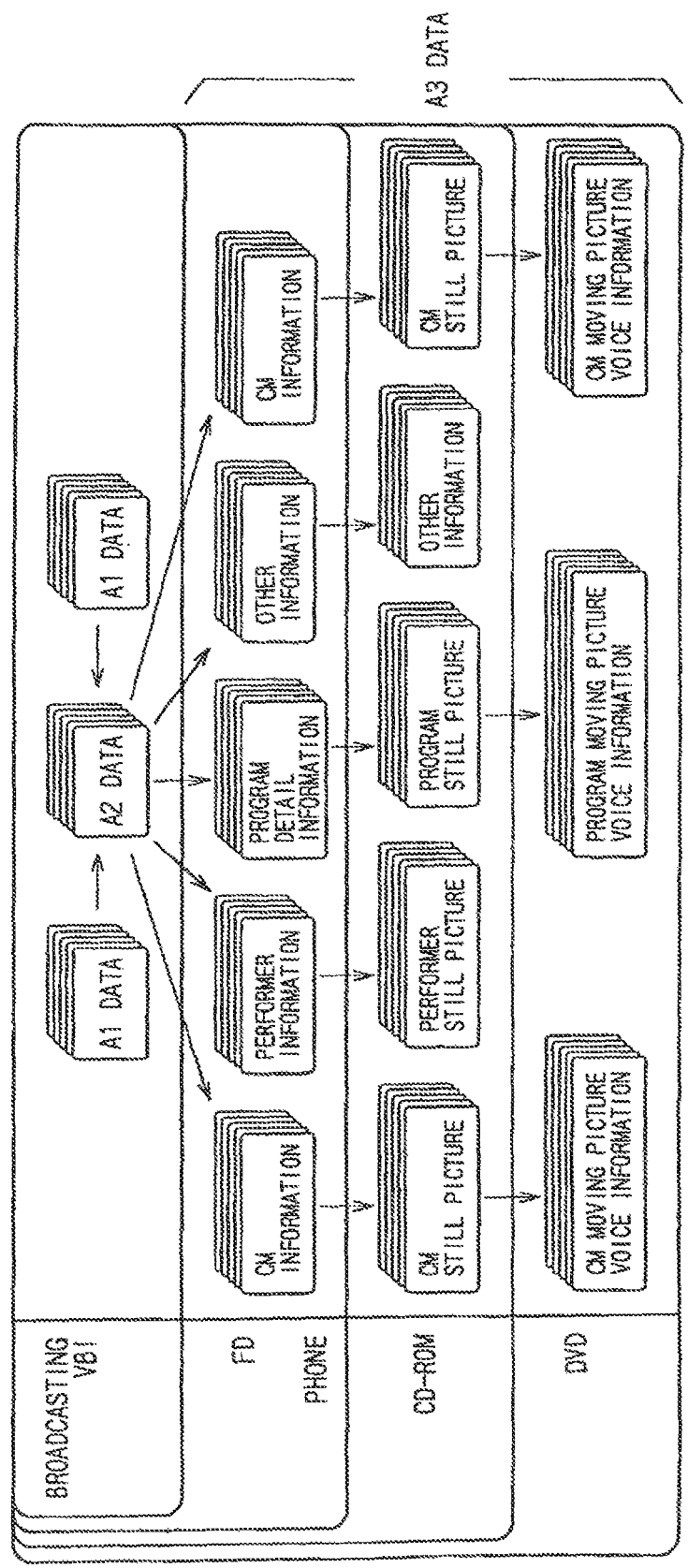
FIG. 11 is a diagrammatic view illustrating a relationship between types of information to be provided through media and the media in the AV system of FIG. 1.

FIG. 11 illustrates a relationship between the data amount of the A data and the transmission method. As seen in FIG. 11, it is possible to provide, for example, only the A1 data and the A2 data in a superposed relationship with a vertical blanking period (VBI) of a television signal to the user. Information which additionally includes CM information, performer information, program detail information and other character information which form the A3 data can be provided by a floppy disc (FD) or a telephone line. Information which additionally includes a still picture of a CM, a still picture of a performer, a still picture of a program and other still pictures can be recorded onto and provided as a CD-ROM. Further, information which additionally includes data of moving pictures and voice of a CM, moving pictures and voice of a program and so forth can be provided by a DVD or a like. In this manner, data can be used individually or in combination.

Since the data amount varies depending upon the combination of the different types of information mentioned above, a different EPG can be produced by changing the combination of media. For example, data to be provided are different depending upon what combination of a VBI of a television signal, a telephone line, a floppy disc, a CD-ROM and a DVD the media by which data are to be provided are. Accordingly, also an EPG to be displayed is different depending upon data to be provided.

Also by the PDA unit 4, an EPG is produced in a basically similar manner as described above and displayed on a screen of an LCD or the like.

The user can manually operate the mouse 2 or the like to select a desired program or effect program reservation based on a program table and program detail information displayed on the screen of the television receiver 5 in such a manner as described above. Similarly, the user can manually operate a predetermined operation section to select a desired program or effect recording reservation based on a program table and program detail information displayed on the screen of the PDA unit 4.

Further, various media can be used individually or in combination. While, for example, EPG displaying is performed using only program information transmitted thereto in a superposed relationship with a VBI of a television signal or EPG displaying is normally performed using program information of a CD-ROM, when the broadcasting time or the like is changed because of re-broadcasting of a program or a delay of a program or when a broadcast is provided from a key station to a local station and the broadcasting station, the broadcasting day, the broadcasting time, a sponsor or the like is changed, it is also possible to transmit only information of the changed program (change information) (for example, the A1 data for re-broadcasting or local station broadcasting illustrated in FIG. 4A) in a superposed relationship with a VBI of a television signal or through a telephone line.

It is to be noted that, when the A1 data is changed from data transmitted formerly (this similarly applies to the other A2 data, A3 data or B data, C data), it is possible to, for example, provide an identification bit for recognition that the data is change data in advance in the A1 data serial NO. and change this identification bit. On the reception side, the A1 data of the corresponding A1 data serial NO. is updated with reference to the identification bit.

In addition, it is also possible to write a production day, a transmission day and so forth of the A1 data and update the A1 data when latest data are received with reference to the date or to compare contents of received data with contents of data stored at present and update, when the contents exhibit a variation, the data of the old contents with the data of the newly received contents.

In the embodiment described above, actual data are stored one by one as A1 to A3 data. Accordingly, since a plurality of data to be used commonly by a plurality of screens are not provided in an overlapping relationship with each other, much information can be stored by a comparatively small capacity. Further, since data are stored in the form of cards individually for a plurality of kinds (in this instance, the data are stored in a hierarchized state as A1 data, A2 data and A3 data), necessary information can be transmitted by a necessary amount.

Further, since an EPG screen conforming to information transmitted thereto can be produced, even if a plurality of media are used so that those may exist simultaneously or are used individually in order to provide, data of program detail information of a program table to a user, an EPG screen conforming to the provided data can be produced.

By the way, digital television broadcasting which makes use of a satellite or a CATV system is spreading recently. As digital television signals, an SDTV (Standard Definition TV) having a resolution of 720×480 pixels which is common to those of current ground wave broadcasting, an EDTV (Extended Definition TV) having another resolution of 720 or 960×480 pixels, an HDTV (High Definition TV) of 1,920×1,080 pixels and so forth are available. For example, as indicated by a system A of FIG. 12, a system wherein four SDTV signals are distributed by a single carrier is available. Thus, it is possible to use, as shown by another system B of FIG. 12, one band from among the bands of the four SDTV signals is used for an EPG while the three remaining bands are allocated to one HDTV signal. Or, as indicated by a further system C or a still further system D, an EPG may be allocated to one band while three SDTV signals or two EDTV signals are allocated to the three remaining bands.

In this manner, where a digital television signal is used, since the band is broad, all of A1 data to A3 data and screen layout data can be transmitted to a user by radio or wire communication.

Further, while, in the embodiment described above, it is described that an electronic program guide is provided by a medium and displayed, the present invention is not limited to the specific embodiment, and by changing the information to be provided, the present invention can be applied, for example, also to catalog shopping, a karaoke book, a picture book, a travel magazine and so forth and information of a photograph, a picture, sound, moving pictures and so forth can be provided in addition to character information so that it may be displayed on a screen of a television receiver or a display unit so as to be utilized.

It is to be noted that, for a transmission medium for transmitting a program for execution of such processing as described above to a user, in addition to recording media such as a magnetic disc, a CD-ROM and a solid state memory, a communication medium such as a network or a satellite can be utilized.

Having now fully described the invention, it will be apparent to one of ordinary skill in the art that many changes and modifications can be made thereto without departing from the spirit and scope of the invention as set forth herein.

What is claimed is:

1. An information providing apparatus, comprising:
a hierarchizing section configured for hierarchizing electronic program guide information to be provided into first information which designates predetermined information on specific broadcasts of a program and second information to be referred to by the first information for general information on said program;
a first providing section configured for providing at least one of the hierarchized first information and second information; and
a second providing section configured for providing layout information from within the electronic program guide information which relates to a layout when the electronic program guide information is to be displayed on a screen,
wherein said hierarchizing section determines that information of the electronic program guide information which is changed between key station broadcasting and local station broadcasting as the first information and determines that information of the electronic program guide information which is not changed as the second information.

2. An information providing apparatus according to claim 1, wherein said first providing section provides the first information or the second information by radio or wire communication or by a recording medium, and said second providing section provides the layout information by radio or wire communication or by a recording medium.

3. An information providing apparatus according to claim 1, wherein said first providing section provides the first information by radio or wire communication when a broadcasting time of a program is changed.

4. An information providing apparatus according to claim 3, wherein said first providing section provides the first information in a superposed relationship with a vertical blanking period of a television signal.

5. An information providing apparatus according to claim 3, wherein said first providing section provides the first information digitally in a superposed relationship with a television signal.

6. An information providing apparatus according to claim 1, wherein said first providing section and said second providing section provide the first information and the second information as well as the layout information digitally by means of radio or wire communication.

7. An information providing apparatus according to claim 1, wherein said hierarchizing section hierarchizes the second information further into third information which is small in amount and is referred to by the third information and fourth information which is large in amount and is referred to by the first information or the third information.

8. An information providing apparatus according to claim 7, wherein the first information is information in units of a program to be broadcast and the third information of the second information includes information for identifying a performer who constructs the program while the fourth information of the second information includes information regarding details of a performer who performs in the program.

9. An information providing apparatus, comprising:
a hierarchizing section configured for hierarchizing electronic program guide information to be provided into first information which designates predetermined information on specific broadcasts of a program and second information to be referred to by the first information for general information on said program;
a first providing section configured for providing at least one of the hierarchized first information and second information; and
a second providing section configured for providing layout information from within the electronic program guide information which relates to a layout when the electronic program guide information is to be displayed on a screen,
wherein said hierarchizing section determines that information of the electronic program guide information which is changed between regular broadcasting and rebroadcasting as the first information and determines that information of the electronic program guide information which is not changed as the second information and determines still picture data, voice data, and moving picture data as third information.

10. An information providing method, comprising the steps of:
hierarchizing electronic program guide information to be provided into first information which designates predetermined information on specific broadcasts of a program and second information to be referred to by the first information for general information on said program;
providing at least one of the hierarchized first information and second information; and
providing layout information from within the electronic program guide information which relates to a layout when the electronic program guide information is to be displayed on a screen,
wherein said hierarchizing step determines that information of the electronic program guide information which is changed between key station broadcasting and local station broadcasting as the first information and determines that information of the electronic program guide information which is not changed as the second information.

11. A display controlling apparatus, comprising:
a first acquiring section for acquiring, from within electronic program guide information hierarchized into first information which designates predetermined information on specific broadcasts of a program and second information to be referred to by the first information for general information on said program, at least one of the first information and the second information;
a second acquiring section for acquiring layout information of the electronic program guide information regarding a layout when the electronic program guide information is to be displayed on a screen; and
a producing section for producing display information to be used to display the electronic program guide information from at least one of the first information and the second information, and the layout information,
wherein the first information includes information of the electronic program guide information which is changed between key station broadcasting and local station broadcasting and the second information includes information of the electronic program guide information which is not changed.

12. A display controlling apparatus according to claim 11, further comprising a display for displaying the electronic program guide information.

13. A display controlling apparatus according to claim 11, wherein said producing section retrieves information necessary to be displayed from the first information or the second information in response to the layout information and produces the display information in response to the retrieved information and the layout information.

14. A display controlling apparatus according to claim 13, wherein said producing section hierarchizes the retrieved information into first intermediate information regarding contents to be displayed at individual layout positions based on the layout information and second intermediate information to be referred to by the first intermediate information and designates the first information.

15. A display controlling apparatus according to claim 14, wherein said producing section sorts the first information to be designated as the second intermediate information.

16. A display controlling apparatus according to claim 15, further comprising an instructing section for instructing sorting of the first information to be designated as the second intermediate information.

17. A display controlling apparatus according to claim 11, wherein said first or second acquiring section acquires at least one of the first information, the second information and the layout information from a recording medium.

18. A display controlling apparatus according to claim 11, wherein said first or second acquiring section fetches at least one of the first information, the second information and the layout information from data transmitted thereto by radio or wire communication.

19. A display controlling method, comprising the steps of:
acquiring, from within electronic program guide information hierarchized into first information which designates predetermined information on specific broadcasts of a program and second information to be referred to by the first information for general information on said program, at least one of the first information and the second information;
acquiring layout information regarding a layout of the electronic program guide information when the electronic program guide information is to be displayed on a screen; and
producing display information to be used to display the electronic program guide information from at least one of the first information and the second information, and the layout information,
wherein the first information includes information of the electronic program guide information which is changed between key station broadcasting and local station broadcasting and the second information includes information of the electronic program guide information which is not changed.

* * * * *